United States Patent [19]

Hoyer

[11] Patent Number: 4,582,962
[45] Date of Patent: Apr. 15, 1986

[54] TELEPHONE MOUNTING STABILIZER AND NOTE BOARD FACILITY

[76] Inventor: Dennis G. Hoyer, Annabeth Rd., R.D. #1, Oley, Pa. 19547

[21] Appl. No.: 601,797

[22] Filed: Apr. 19, 1984

[51] Int. Cl.$^4$ .................. H04M 1/21; H04M 1/04; A47B 97/04
[52] U.S. Cl. .................. 179/146 R; 40/336; 179/178; 248/450; D19/52
[58] Field of Search .............. 179/146 R, 178, 100 R, 179/100 C; 40/336, 337, 338, 339; 248/450; D19/52

[56] References Cited

U.S. PATENT DOCUMENTS

| | | | |
|---|---|---|---|
| 3,085,134 | 4/1963 | Bissonnette | 179/146 R |
| 3,843,166 | 10/1974 | Barone | 281/15 B |
| 4,319,422 | 3/1982 | Robins | 40/622 |
| 4,425,724 | 1/1984 | Scott | 40/124 |

OTHER PUBLICATIONS

"Teladesk" *House Beautiful*, Oct. 1973, p. 218.
ITT Modular Wall Phone, *Telephony*, Sep. 12, 1977.
CAC 228 Spacer Installation Instructions", Communication Apparatus Co. #0-304-001, Issue 1, Aug. 1978.

*Primary Examiner*—Gene Z. Rubinson
*Assistant Examiner*—Danita R. Byrd
*Attorney, Agent, or Firm*—Leonard M. Quittner

[57] ABSTRACT

A device for stabilizing modular wall mounted telephone installations in which the device, made of a laminate comprising a first outer, yieldable layer, such as cork, and a second rigid, inner such as urethane, acts as a shim between the telephone base and the wall thereby making it stationary relative to the wall. The device is planarly enlarged so that the outer layer may be used for decoration or for holding notes, messages, writing materials and other accessories useful in telephonic communication.

6 Claims, 7 Drawing Figures

TELEPHONE MOUNTING STABILIZER AND NOTE BOARD FACILITY

BACKGROUND OF THE INVENTION

1. The Field of the Invention

The field of the invention relates to an improved stabilizer for so-called modular telephones, and in conjunction therewith, the utilization of the stabilizing means, by extension of its width and length, for home decoration or as a handy facility for the location nearby to the telephone of supplies for taking notes and displaying reminders, activities closely related to telephonic activities.

2. Description of the Prior Art

The prior art is best demonstrated by U.S. Pat. No. 3,843,166 to Barone which teaches only a note keeping device for attachment to a wall mounted telephone. That invention deals exclusively with so-called hard wired, permanent wall mounted telephone installations which were universally popular until the recent development of the so-called modular installations. Barone teaches a device of a type superficially similar to the present invention but which is limited to mounting only in a permanent wall installation by disassembling the telephone from the back-plate and re-assembly after the device is bolted on. Barone's device itself has no effect upon, nor does it address, a modular telephone installation which is, by its nature, unstable wherein the installed telephone base may move relative to the wall. Additionally Barone's teaching depends for its success in large measure on magnetic properties of the material used to fabricate the note board. The present invention addresses recently exposed problems created by flush mounted modular wall telephone installations which, after the telephone is installed, leave the modular telephone base raised away from the wall on a pair of pins or lugs which are part of the wall jack unsupported. This allows the telephone, because of overhang and loose fit, to rock about the pins unstably, to the inconvenience of the user and to the eventual damage of the equipment.

Current wall jack design represents a substantial, unanticipated change from the type encountered by Barone leaving the problems above-listed. Attempts to cure these problems have been confined, however, to simply constructed spacers made of a hard, noncompressible, non-yieldable plastic material such as Urethane. Attention is directed to Spacer Number CAC 228, a product of Communication Apparatus Company, a division of Superior Cable Corporation; instruction sheet number 0-304-001, issued August, 1978. Such constructions do not overcome small variations in wall surface adjacent to the wall jack and the region between the jack and wall, nor are these of such flexible design as to permit one spacer type to function for a variety of telephone styles or designs. The result is that the spacer installed does not properly function and the instability remains.

The present invention not only provides the conveniences of Barone but the additional added flexibility for use in note keeping or decor and eliminates in a new and novel way the instability associated with modular installations. Further, the combination of a compressible, yieldable, roomside surface and a rigid, wallside surface in the present invention provides an infinite array of optional mounting possibilities for the location of note keeping materials not available in Barone or for use in decoration.

SUMMARY OF THE INVENTION

The invention described herein discloses a device which fits around a modular telephone wall jack installation. It uniquely stabilizes by eliminating motion relative to the wall a telephone base fitted onto the jack by providing a laminated shim around the periphery of the jack and between the wall and the telephone base. The laminate comprises a first, outer or roomside, layer of cork or other substance which yieldably compresses between the telephone base and a firm inner layer which is in close contact with the wall, thereby ensuring snugness, said second, inner or wallside layer, being made of a rigid but pierceable material such as wood, Formica ®, Lucite ®, urethane, or the like.

Expansion of the laminate in width and length planarly permits the outer layer to serve as an area modifiable for home decor or for placing notes, reminders, writing materials, and other impedimenta of telephonic activity and will conceal any unsightly holes inevitably left in the wall in the conversion from hard to modular wiring if such is the case.

DESCRIPTION OF DRAWINGS

The present invention maybe better understood and its numerous objects and advantages will become apparent to those skilled in the art by reference to the drawings wherein seven (7) figures are shown on two (2) sheets.

DESCRIPTION OF THE PREFERRED EMBODIMENT

Figure 1:
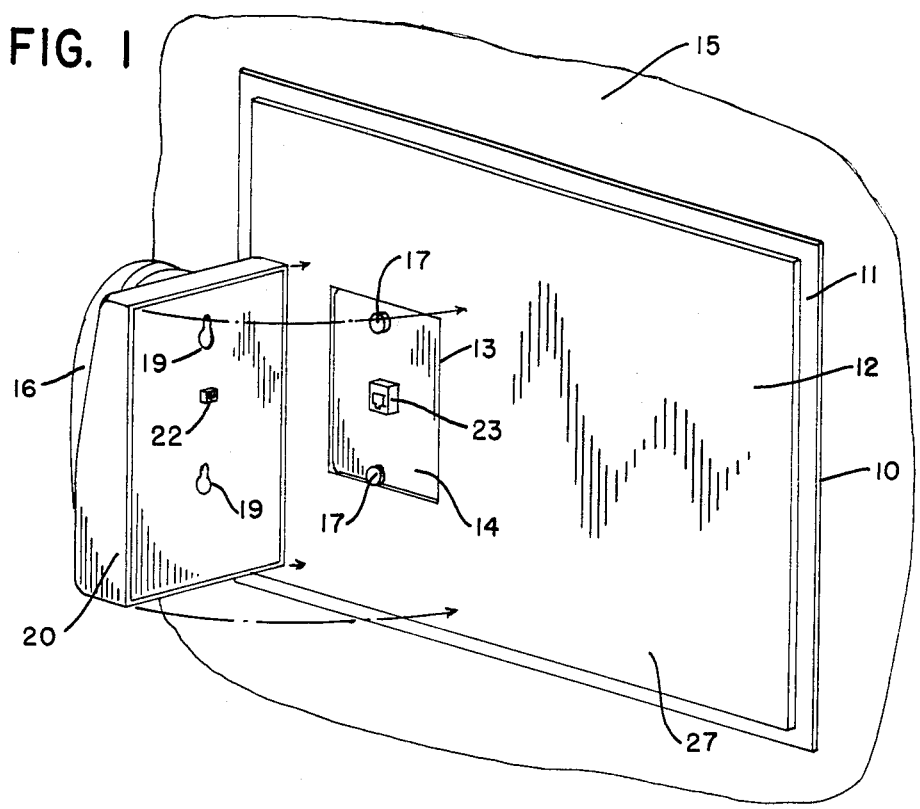
FIG. 1 shows the stabilizer/noteboard in its mounted position surrounding the periphery of a modular wall jack and a modular wall telephone about to be installed on the lugs thereon.
Figure 2:
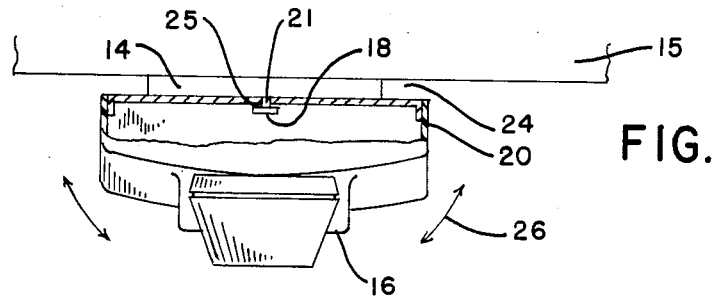
FIG. 2 shows a top view of a typical, unimproved modular wall telephone installation which indicates thereon the inherent instability thereof.
Figure 3:
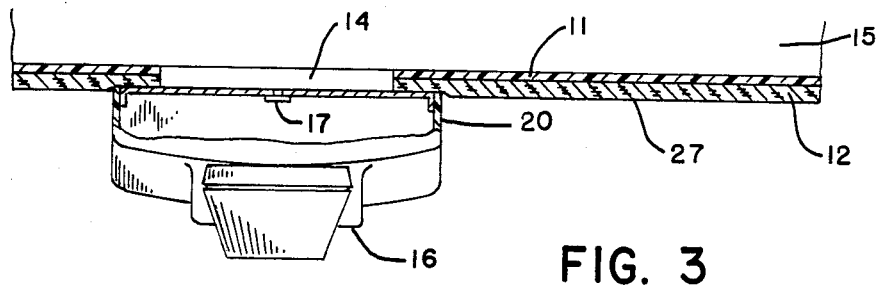
FIG. 3 shows a top view of a typical modular wall telephone installation with the stabilizer/noteboard improvement in place, stabilizing the telephone base.
Figure 4:
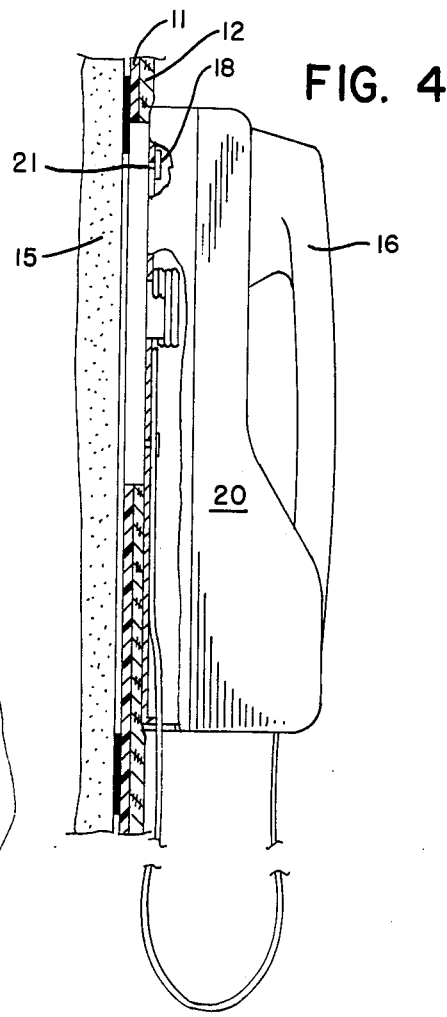
FIG. 4 shows a side view of a saddle type wall mounted base with another popular style of telephone mounted to advantage.
Figure 7:
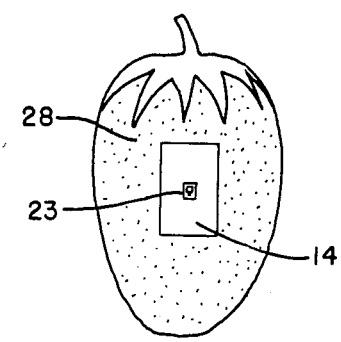
FIG. 7 depicts a typical decorative presentation of the stabilizer as it surrounds a wall jack.
Figure 5:
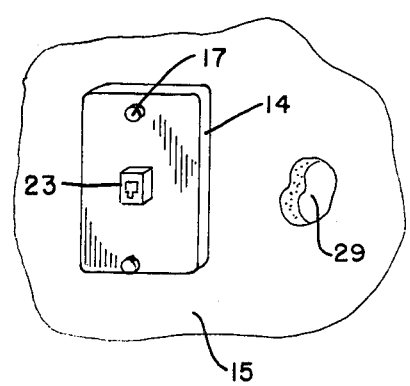
FIG. 5 shows an installed, modular wall jack alongside a previous former hard mounted location.
Figure 6:
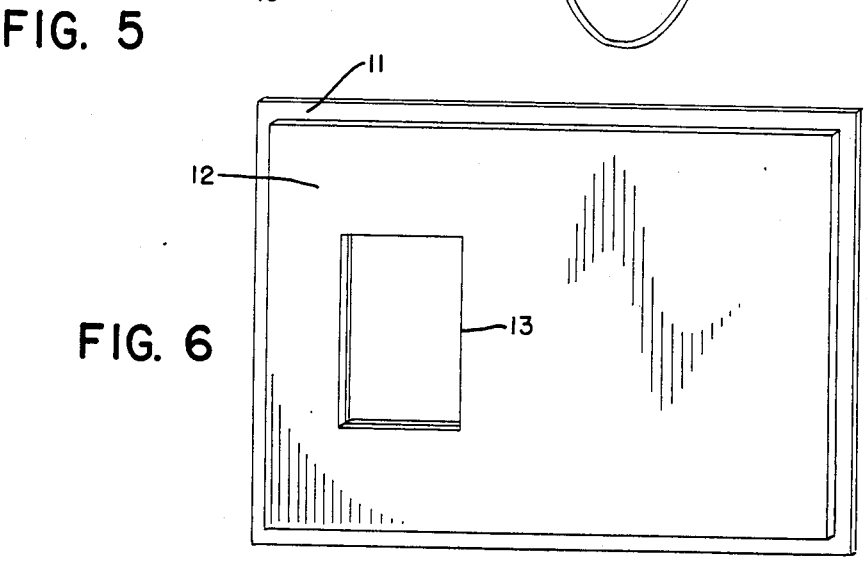
FIG. 6 is a front perspective view of the stabilizer/noteboard with the note keeping area adjacent to the stabilizing area and the jack passage located acentrically.

The device (10) is typically rectilinear in shape and consists of an inner, planiform layer (11) of a rigid but pierceable material such as formica, urethane or wood and an outer, planiform layer (12) of a yieldable and compressable material such as a cork or rubber. Acentrically located is a passage (13), or opening, of typically rectilinear configuration whose edges are parallel with the edges of the device. The passage has a width which is somewhat larger than that defined by the width of a standard modular wall jack (14) and a length somewhat longer than that defined by the length of the wall jack, such that the device may be installed surrounding the periphery of the jack flat against a wall (15) in the vicinity of the jack and a wall telephone (16) may be slidably installed over the device and onto on the lugs (17) of the jack by inserting the lug heads (18) into keyhole slots (19) found on the telephone base (20) of the telephone and pushing downward thereby engaging the shanks (21) of the lugs in the base, the plug (22) in the wall jack outlet (23) and compressing the cork outer layer with the base to ensure a snug, stable installation of wall telephone to jack free of motion relative to the wall. The device takes up the region (24) which is otherwise overhung by the telephone base and the region around the lugs (25) which are the cause of the instability (26). The expanded area of laminate (27) is now rigidly installed and is then servicable for mounting of note taking means, bulletins, written messages and the like. For decoration only reference is made to FIG. 7 which shows a typical device (28) which serves solely as a stabilizer but provides decoration.

The expanded surface of the laminate is additionally useful in concealing damage (29) to the wall left from a previous hard wired installation.

What is claimed is:

1. A device for stabilizing and making stationary relative to a wall surface a modular wall-mounted telephone having a keyhole slotted base mounted to a flush mounted wall jack having a periphery and lugs, said device in combination comprising a first planiform, inner or wallside layer of rigid material to which is adhered by adhesive means a second planiform, outer or roomside layer of compressible, yieldable material, by which the first and second layers form together a laminate of a defined thickness which is thicker than the telephone jack such that when the wall-mounted modular telephone is installed on the jack lugs by slidably and compressibly engaging through the keyhole slots the base to the lugs and the compressible roomside layer, the telephone becomes stable and stationary relative to the wall, said laminate having a passage of rectilinear cross-section planarly contained therein to permit encirclement of the periphery of the telephone jack, thereby causing the telephone and laminate to become in close, stable contact with each other and stationary relative to the wall.

2. As in claim 1 wherein the laminate is extended laterally and longitudinally to provide an area adjacent to the telephone which is shaped decoratively.

3. As in claim 1 wherein the laminate is extended laterally and longitudinally to provide an area adjacent to the telephone upon which are installed by piercing means through the yieldable layer into the rigid layer accessories for note taking.

4. As in claim 1 or 2 or 3 wherein the yieldable layer is a member of a class comprising cork and rubber.

5. As in claim 4 wherein the yieldable layer is cork.

6. As in claim 1 or 2 or 3 wherein the passage is acentrically located.

* * * * *